United States Patent
Christodoulou et al.

(10) Patent No.: US 11,356,149 B2
(45) Date of Patent: Jun. 7, 2022

(54) APPARATUS AND METHOD FOR NON-COHERENT JOINT DETECTION IN WIRELESS COMMUNICATION SYSTEMS

(71) Applicant: Samsung Electronics Co., Ltd, Suwon-si (KR)

(72) Inventors: Louis Christodoulou, Middlesex (GB); Shangbin Wu, Middlesex (GB); Yue Wang, Middlesex (GB); Yinan Qi, Middlesex (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 68 days.

(21) Appl. No.: 16/497,431

(22) PCT Filed: Mar. 23, 2018

(86) PCT No.: PCT/KR2018/003463
§ 371 (c)(1),
(2) Date: Sep. 24, 2019

(87) PCT Pub. No.: WO2018/174652
PCT Pub. Date: Sep. 27, 2018

(65) Prior Publication Data
US 2020/0106487 A1    Apr. 2, 2020

(30) Foreign Application Priority Data

Mar. 24, 2017  (GB) ..................................... 1704669

(51) Int. Cl.
*H04W 4/00*  (2018.01)
*H04B 7/024*  (2017.01)
(Continued)

(52) U.S. Cl.
CPC ........... *H04B 7/024* (2013.01); *H04B 7/0417* (2013.01); *H04B 7/0456* (2013.01); *H04L 5/0035* (2013.01); *H04B 7/0626* (2013.01)

(58) Field of Classification Search
CPC .... H04B 7/024; H04B 7/0417; H04B 7/0456; H04B 7/0606; H04B 7/0639
See application file for complete search history.

(56) References Cited

U.S. PATENT DOCUMENTS 9,094,145 B2    7/2015  Yue et al.
9,337,970 B2*   5/2016  Hammarwall ........ H04L 5/0091
(Continued)

FOREIGN PATENT DOCUMENTS

KR   10-2013-0031261 A     3/2013
WO   2011136372 A1    11/2011
(Continued)

OTHER PUBLICATIONS

Intellectual Property Office (UK), Combined Search and Examination Report under Sections 17 & 18(3), Application No. GB1704669. 9, dated Sep. 14, 2018, 2 pages.
(Continued)

*Primary Examiner* — Bo Hui A Zhu (57) ABSTRACT

The present disclosure relates to a pre-5$^{th}$-Generation (5G) or 5G communication system to be provided for supporting higher data rates Beyond 4$^{th}$-Generation (4G) communication system such as Long Term Evolution (LTE). Disclosed is a method of operating a telecommunications network comprising a plurality of Base Stations, BS, and a User Equipment, UE, wherein the plurality of BSs and the UE are operable in a particular transmission mode wherein signals are transmitted between the BSs and the UE, and the transmission mode is indicated to the UE.

20 Claims, 4 Drawing Sheets

(51) Int. Cl.
  *H04B 7/0417* (2017.01)
  *H04B 7/0456* (2017.01)
  *H04L 5/00* (2006.01)
  *H04B 7/06* (2006.01)

(56) References Cited

U.S. PATENT DOCUMENTS

| | | | |
|---|---|---|---|
| 9,774,426 | B2* | 9/2017 | Seo ................... H04L 1/0029 |
| 2013/0021925 | A1 | 1/2013 | Yin et al. |
| 2013/0102353 | A1 | 4/2013 | Sagae et al. |
| 2013/0310098 | A1 | 11/2013 | Baligh et al. |
| 2018/0227029 | A1* | 8/2018 | Nammi ............... H04B 7/0647 |

FOREIGN PATENT DOCUMENTS

| | | |
|---|---|---|
| WO | 2015034411 A1 | 3/2015 |
| WO | 2015113206 A1 | 8/2015 |
| WO | 2017121281 A1 | 7/2017 |
| WO | 2017206100 A1 | 12/2017 |
| WO | 2018058563 A1 | 4/2018 |

OTHER PUBLICATIONS

"3rd Generation Partnership Project; Technical Specification Group Radio Access Network; Study on further enhancements to Coordinated Multi-Point (CoMP) Operation for LTE (Release 14)", 3GPP TR 36.741 V14.0.0 (Mar. 2017), 25 pages.

"3rd Generation Partnership Project; Technical Specification Group Radio Access Network; Coordinated multi-point operation for LTE physical layer aspects (Release 11)", 3GPP TR 36.819 v11.2.0 (Sep. 2013), 70 pages.

"3rd Generation Partnership Project; Technical Specification Group Radio Access Network; Study on New Radio (NR) access technology (Release 15)", 3GPP TR 38.912 V15.0.0 (Jun. 2018), 74 pages.

"3rd Generation Partnership Project; Technical Specification Group Radio Access Network; Evolved Universal Terrestrial Radio Access (E-UTRA); Physical layer procedures (Release 15)", 3GPP TS 36.213 V15.3.0 (Sep. 2018), 546 pages.

Intel Corporation, ZTE, "New WID: Further enhancements to Coordinated Multi-Point (CoMP) Operation for LTE", 3GPP TSG RAN Meeting #75, Mar. 6-9, 2017, RP-170750, 5 pages.

NTT Docomo, Inc., "New WID on New Radio Access Technology", 3GPP TSG RAN Meeting #75, Mar. 6-9, 2017, RP-170847, 8 pages.

"RAN1 Chairman's Notes", 3GPP TSG RAN WG1 Meeting #88bis, Apr. 3-7, 2017, 113 pages.

MCC Support, "Final Report of 3GPP TSG RAN WG1 #90 v1.0.0 (Prague, Czech Rep, Aug. 21-25, 2017)", 3GPP TSG RAN WG1 Meeting #90bis, Oct. 9-13, 2017, R1-1716941, 172 pages.

Samsung, "Discussion on non-coherent joint transmission for FeCoMp", 3GPP TSG RAN WG1 #85, May 23-27, 2016, R1-164800, 3 pages.

Huawei, HiSilicon, "Potential enhancements for non-coherent JT", 3GPP TSG RAN WG1 Meeting #86, Aug. 22-26, 2016, R1-167143, 5 pages.

ZTE, ASTRI, "QCL Issues of Joint Transmission", 3GPP TSG RAN WG1 Meeting #87, Nov. 14-18, 2016, R1-1611441, 5 pages.

Qualcomm Incorporated, "Enhancements for Non-Coherent Joint Transmission", 3GPP TSG RAN WG1 #88, Feb. 13-17, 2017, R1-1702574, 6 pages.

Samsung, "Enhancements for non-coherent JT", 3GPP TSG RAN WG1 #88, Feb. 13-17, 2017, R1-1702898, 3 pages.

Samsung, "Discussions on NR network coordination", 3GPP TSG RAN WG1 Meeting #88, Feb. 13-17, 2017, R1-1702924, 5 pages.

Huawei, HiSilicon, "Discussion on enhancements for non-coherent JT", 3GPP TSG RAN WG1 Meeting #88, Feb. 13-17, 2017, R1-1703063, 6 pages.

Huawei, HiSilicon, "WF on CSI measurement and feedback for non-coherent JT", 3GPP TSG RAN WG1 Meeting #89, May 15-19, 2017, R1-1709391, 2 pages.

Ran WG1, "LS on RRC parameters for FeCoMP", 3GPP TSG-RAN WG1 Meeting #90, Aug. 21-25, 2017, R1-1715332, 1 page.

Ericsson, "Introduction of feCoMP into 36.211", 3GPP TSG-RAN1 Meeting #91, Nov. 27-Dec. 1, 2017, R1-1719240, 16 pages.

Motorola Mobility, Lenovo, Introduction of feCoMP into 36.213, Change Request, 3GPP TSG RAN WG1 Meeting #90bis, Nov. 27-Dec. 1, 2017, R1-1721099, 260 pages.

Intel Corporation, "Introduction of further enhancements to CoMP", Change Request, 3GPP TSG RAN WG2 Meeting #101bis, Feb. 26-Mar. 2, 2018, R2-1802898, 15 pages.

International Search Report dated Jul. 26, 2018 in connection with International Patent Application No. PCT/KR2018/003463, 3 pages.

Written Opinion of the International Searching Authority dated Jul. 26, 2018 in connection with International Patent Application No. PCT/KR2018/003463, 7 pages.

Intel Corporation, "Enhancements and TP for non-coherent JT", 3GPP TSG RAN WG1 Meeting #88, Feb. 13-17, 2017, R1-1702171, 5 pages.

Supplementary European Search Report dated Feb. 11, 2020 in connection with European Patent Application No. 18 77 0332, 10 pages.

Communication pursuant to Article 94(3) EPC dated May 6, 2021, in connection with European Patent Application No. 18770332.7, 10 pages.

Intellectual Property India, "Examination report under sections 12 & 13 of the Patents Act" dated Feb. 4, 2022, in connection with Indian Patent Application No. 201937043010, 6 pages.

* cited by examiner

Coherent Joint Transmission

[Fig. 5B]

Non-Coherent Joint Transmission

APPARATUS AND METHOD FOR NON-COHERENT JOINT DETECTION IN WIRELESS COMMUNICATION SYSTEMS

CROSS-REFERENCE TO RELATED APPLICATIONS

This application is a 371 of International Application No. PCT/KR2018/003463 filed on Mar. 23, 2018, which claims priority to United Kingdom Patent Application No. 1704669.9 filed on Mar. 24, 2017, the disclosures of which are herein incorporated by reference in their entirety.

BACKGROUND

1. Field

The present invention is concerned with improvements relating to the operation of Base Stations (BS) and User Equipments (UE) in non-coherent joint detection (NCJT) mode.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

SUMMARY

It is an aim of embodiments of the present invention to provide a means whereby the UE and the network overall is able to maximise performance in NCJT mode, for example in terms of data throughput.

According to various embodiments, a method for operating a user equipment (UE) to communicate with a plurality of base stations (BSs) in a wireless communication, the method comprises receiving, from a base station BS of the plurality of BSs, information for indicating a transmission mode in coordinated multi-point operation (CoMP). The plurality of BSs and the UE are operable in the transmission mode. Signals are transmitted between the plurality of BSs and the UE.

According to various embodiments, a method for operating a base station (BS) in a wireless communication, the method comprises transmitting, to a user equipment (UE), information for indicating a transmission mode in coordinated multi-point operation (CoMP) to the UE communicate with a plurality of BSs. The plurality of BSs and the UE are operable in the transmission mode. Signals are transmitted between the plurality of BSs and the UE.

According to various embodiments, an apparatus of a user equipment (UE) to communicate with a plurality of base stations (BSs) in a wireless communication, the apparatus comprises at least one transceiver and at least one processor operably coupled to the at least one transceiver. The at least one transceiver is configured to receive, from a base station BS of the plurality of BSs, information for indicating a transmission mode in coordinated multi-point operation (CoMP). The plurality of BSs and the UE are operable in the transmission mode. Signals are transmitted between the plurality of BSs and the UE.

According to various embodiments an apparatus of a base station (BS) in a wireless communication, the apparatus comprises at least one transceiver and at least one processor operably coupled to the at least one transceiver. The at least one transceiver is configured to transmit, to a user equipment (UE), information for indicating a transmission mode in coordinated multi-point operation (CoMP) to the UE communicate with a plurality of BSs. The plurality of BSs and the UE are operable in the transmission mode. Signals are transmitted between the plurality of BSs and the UE The above and other aspects, and features and advantages of certain exemplary embodiments and aspects of the present invention will be more apparent from the following detailed description when taken in conjunction with the accompanying drawings, in which:

Various embodiments of the present disclosure provide an improved system performance.

BRIEF DESCRIPTION OF THE DRAWINGS

The above and other aspects, and features and advantages of certain exemplary embodiments and aspects of the present invention will be more apparent from the following detailed description when taken in conjunction with the accompanying drawings, in which.

For a better understanding of the invention, and to show how embodiments of the same may be carried into effect, reference will now be made, by way of example only, to the accompanying diagrammatic drawings in which.

DETAILED DESCRIPTION

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for phase tracking reference signal in a wireless communication system.

The terms referring a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

Figure 1:
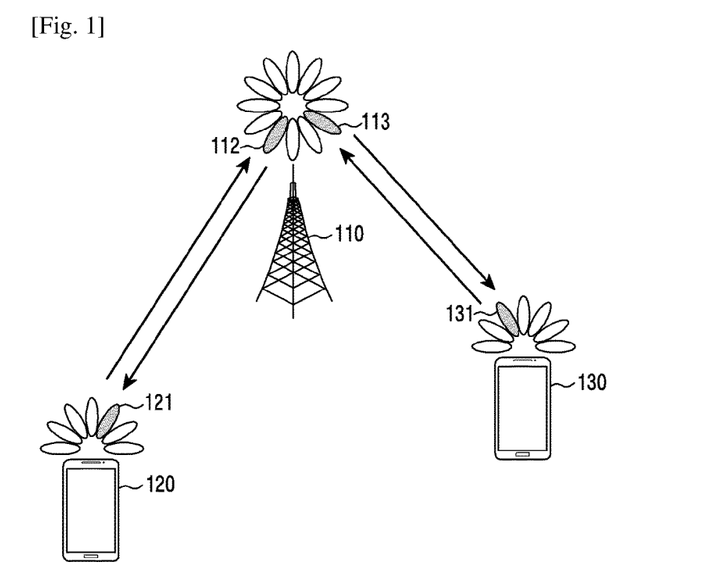
FIG. 1 illustrates a wireless communication system according to various embodiments of the present disclosure.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5$^{th}$ generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

Figure 2:
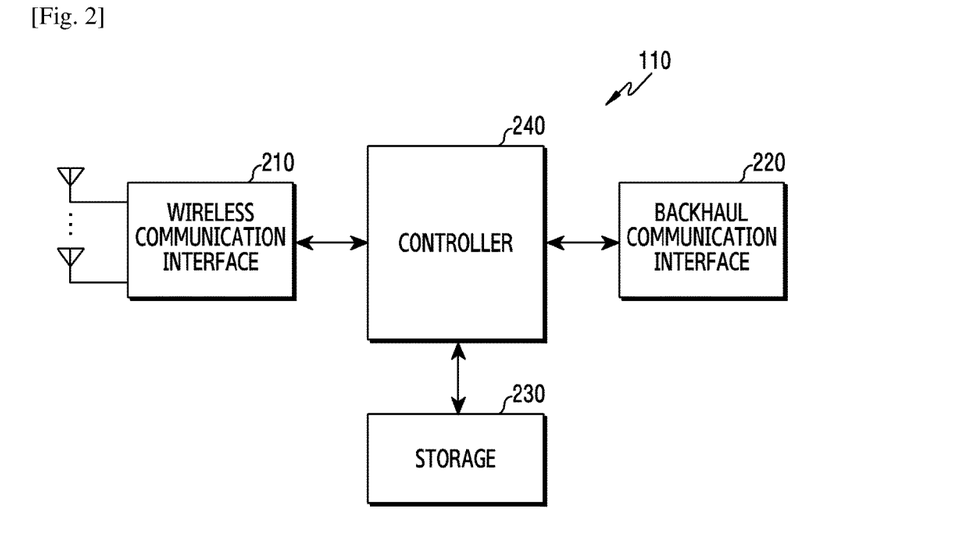
FIG. 2 illustrates the BS in the wireless communication system according to various embodiments of the present disclosure.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor.

According to exemplary embodiments of the present disclosure, the wireless communication system comprises a system according to 3rd Generation Partnership Project (3GPP) 5th Generation (5G) New Radio (NR). According to exemplary embodiments of the present disclosure, the base station is a gNB and the one or more mobile devices are User Equipment (UE).

According to various embodiments, a method for operating a base station (BS) in a wireless communication, the method comprises transmitting, to a user equipment (UE), information for indicating a transmission mode in coordinated multi-point operation (CoMP) to the UE communicate with a plurality of BSs. The plurality of BSs and the UE are operable in the transmission mode, and signals are transmitted between the plurality of BSs and the UE.

In some embodiments, the transmission mode is non-coherent joint transmission, NCJT, mode.

In some embodiments, the transmission mode is non-coherent joint transmission, NCJT, mode.

In some embodiments, the method comprises transmitting the information via radio resource control (RRC) signalling.

In some embodiments, an operation mode for the CoMP is changed according to the information by the UE.

In some embodiments, the method further comprises performing channel status information (CSI) process regarding the BS with the UE. The CSI process is associated with CSI-reference signal (CSI-RS) resource for channel measurement.

In some embodiments, the method further comprises receiving a PMI for the BS from the UE. The PMI is determined by using the CSI-process regarding the BS and other CSI processes regarding other BSs of the plurality of BSs based on the transmission mode.

In some embodiments the PMI is computed such that a function:

$$f(H_1, H_2, \ldots, H_N, W_1, W_2, \ldots, W_N) = \sum_{k=1}^{N} \log_2\left(1 + \frac{\lambda_k}{N_0}\right)$$

is maximized, where $H_i$ represents a channel matrix between the UE and i-th BS, Wi represents a precoding matrix for i-th BS, N represents a number of the plurality of BSs, $\lambda_k$ represents a eigenvalue for a channel for k-th BS, and No represents a noise.

According to exemplary embodiments of the present disclosure, a computer program comprises instructions which, when executed by a controller or processor of the base station, cause the controller or processor to implement an apparatus of the base station. According to exemplary embodiments of the present disclosure, a computer-readable storage medium stores the computer program. For example, the controller 240 may control the base station to perform operations according to the exemplary embodiments of the present disclosure.

Figure 3:
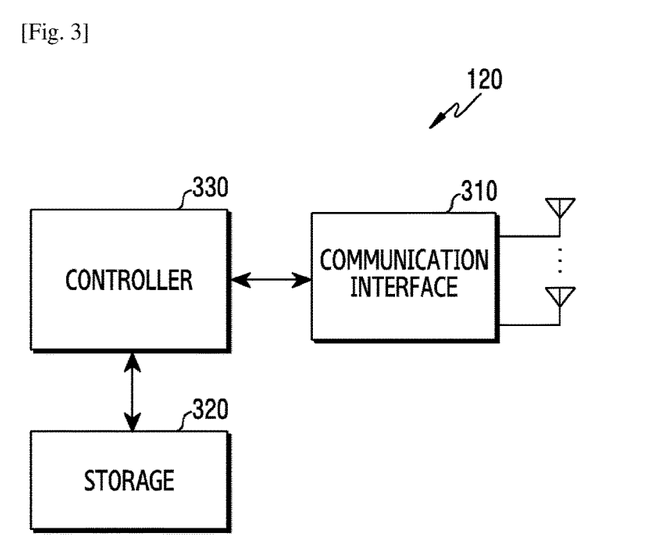
FIG. 3 illustrates the terminal in the wireless communication system according to various embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP).

According to various embodiments, method operating a compristransmissionco a plurality of he plurality of BSs and the UE are operable in transmission mode signals are transmitted between the BSs and the UE.

According to various embodiments, a method for operating a user equipment (UE) to communicate with a plurality of base stations (BSs) in a wireless communication, the method comprises receiving, from a base station BS of the plurality of BSs, information for indicating a transmission mode in coordinated multi-point operation (CoMP). The plurality of BSs and the UE are operable in the transmission mode, and signals are transmitted between the plurality of BSs and the UE.

In some embodiments, the transmission mode is non-coherent joint transmission, NCJT, mode.

In some embodiments, the information is transmitted via radio resource control (RRC) signalling.

In some embodiments, the method further comprises changing an operation mode for coordinated multi-point operation (CoMP) according to the information.

In some embodiments, the method further comprises performing a channel status information (CSI) process regarding each of the plurality of BSs based on the transmission mode. The CSI process is associated with CSI-RS resource for channel measurement.

In some embodiments, the method further comprises determining a precoding matrix indicator, PMI, for each of the plurality of BSs based on the transmission mode, and transmitting the PMI for each of the plurality of BSs to each respective BS. Information of the CSI process in relation to each of the plurality of base stations is used to determine the PMI.

In some embodiments, the method further comprises the PMI is computed such that a function:

$$f(H_1, H_2, \ldots, H_N, W_1, W_2, \ldots, W_N) = \sum_{k=1}^{N} \log_2\left(1 + \frac{\lambda_k}{N_0}\right)$$

is maximized, where Hi represents a channel matrix between the UE and i-th BS, Wi represents a precoding matrix for i-th BS, N represents a number of the plurality of BSs, λk represents a eigenvalue for a channel for k-th BS, and N0 represents a noise.

According to exemplary embodiments of the present disclosure, a computer program comprises instructions which, when executed by a controller or processor of the mobile device, cause the controller or processor to implement an apparatus of the mobile device. According to exemplary embodiments of the present disclosure, a computer-readable storage medium stores the computer program. For example, the controller 330 may control the terminal to perform operations according to the exemplary embodiments of the present disclosure.

Figure 4:
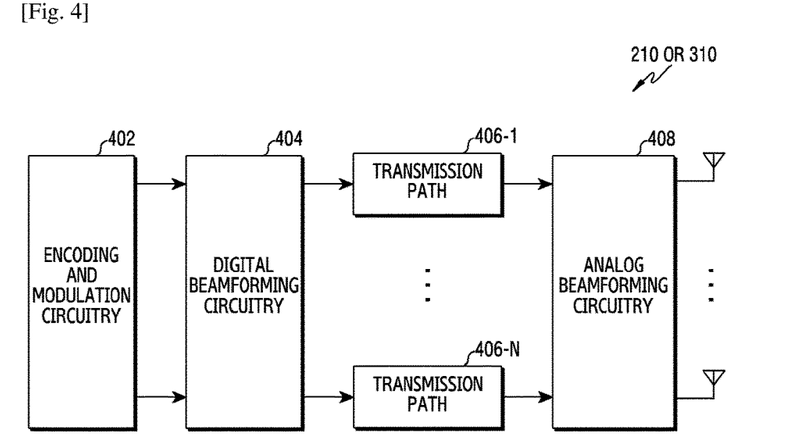
FIG. 4 illustrates the communication interface in the wireless communication system according to various embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Use of CoMP (coordinated multi-point operation) has become widespread in telecommunication systems to improve the coverage of high data rates, cell edge data throughput, and to increase overall system throughput.

Several CoMP schemes are in use and have been evaluated, these include:
Coherent Joint Detection (JT)
Co-ordinated Scheduling (CS)/Co-ordinated Beamforming (CB)
Non-Coherent Joint Detection (NCJT)

In particular, NCJT is of practical interest. In summary, NCJT exploits the MIMO gains from spatial multiplexing, by summing up the streams individually transmitted from different transmission points (TPs). A figure illustrating the concept of NCJT (compared with CJT) is given in FIGS. 5A (CJT) and 5B (NCJT).

Figure 5A:
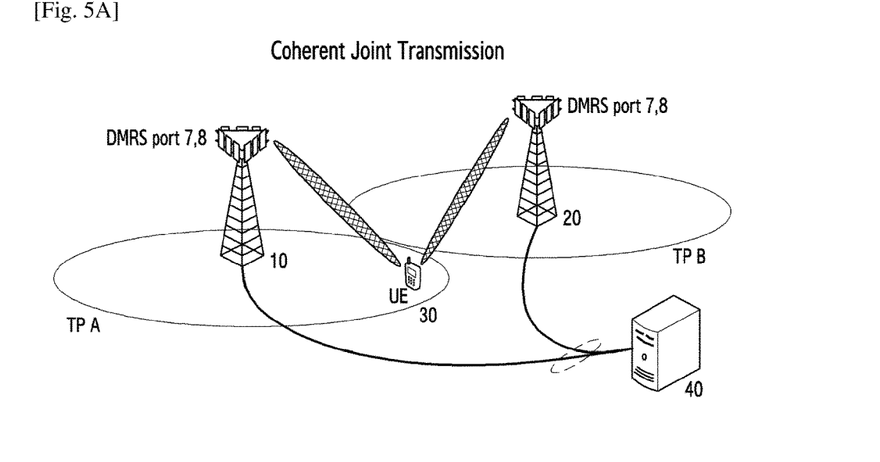
FIGS. 5A and 5B illustrate Coherent and Non-coherent Joint transmission scenarios respectively.
Figure 5B:
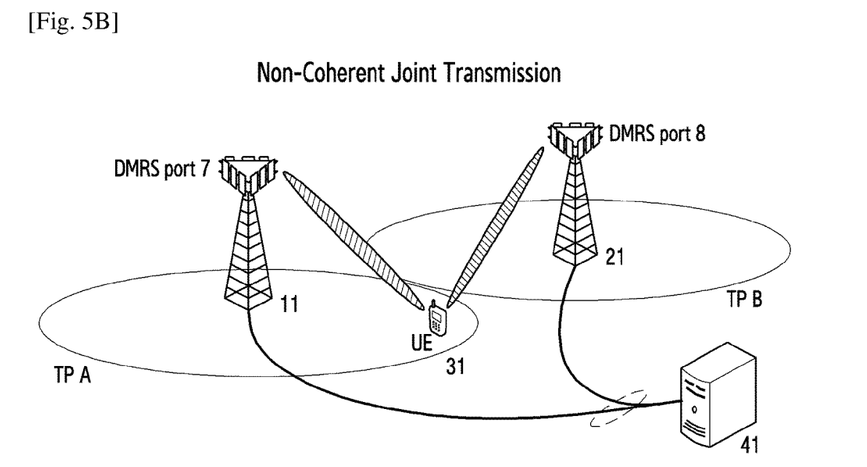

FIG. 5A shows the CJT scenario, where UE 30 is in communication with two separate BSs 10, 20. Electronic device 40 controls the two BSs 10, 20. The configuration is known as Coherent Joint Transmission since the UE is operable sum to the streams individually transmitted from different transmission points (TPs). FIG. 1b shows the NCJT scenario where UE 31 is in communication with two BSs 11, 21 in a non-coherent manner. Electronic device 41 controls the two BSs 11, 21.

NCJT, although supported according to the prior art specification, is expected to limit network performance, since the specification was not designed with NCJT in mind. In particular, a UE, when operating in the NCJT mode, suffers from not being able to operate optimally, in terms of achieving maximum multiplexing gain. The reason is that, in the current specification, the operation mode (Coherent JT, CS/CB, or NCJT) is transparent to the UE, in the sense that the UE does not know that it is operating at the NCJT mode, and therefore is not able to choose the best operation at the UE side (for instance, in a form of Pre-Coding matrix Indicator, PMI) to feedback to the TP.

The UE uses PMI information to signal preferred set of weights to be applied during the precoding process. The UE does this in order to maximize the downlink S/N ratio.

In the existing specifications, a UE can be configured with multiple Channel Status Information (CSI) processes and each CSI process is associated with CSI-RS (Reference Signal) resources for channel measurement and CSI-IM (Interference Measurement) resources for interference measurement. The UE measures and reports the optimized CSI for single TP transmission or coherent JT from multiple TPs. Each reported CSI is optimized for corresponding CSI process and is independent of that for other CSI processes. Using this approach, the traditional CoMP schemes (e.g., Dynamic Port Selection (DPS), Dynamic Point Blanking (DPB), coherent JT, etc.) are able to be supported. It is noted, however, that such mechanisms are not fully applicable to the non-coherent JT since the mutual interference caused by the layers from different TPs are not considered by the existing prior art specification.

It is an aim of embodiments of the present invention to provide a means whereby the UE and the network overall is able to maximise performance in NCJT mode, for example in terms of data throughput.

According to the present invention there is provided an apparatus and method as set forth in the appended claims. Other features of the invention will be apparent from the dependent claims, and the description which follows.

Embodiments of the invention relate to a mechanism of having enhanced control signal, such that a joint optimisation and measurement, and in turn the jointly optimised feedback of the PMIs can be achieved.

In particular, embodiments of the invention relate to a signalling mechanism to facilitate operations of the UE in NCJT mode. The signalling is transmitted from the BS to the UE to explicitly inform the UE of the activation of NCJT, thereby allowing the UE to adapt its behaviour to operate in NCJT mode in relation to the two BSs with which it is communicating.

Throughout this application, reference is made to NCJT in relation to two BSs, but it should be noted that embodiments of the invention may be used with more than two BSs, with this number being exemplary only. In addition, throughout this application, reference is made to PMI calculations at the UE, but it should be noted that other operations at the UE may be facilitated due to the explicit signalling from the BS.

Although a few preferred embodiments of the present invention have been shown and described, it will be appreciated by those skilled in the art that various changes and modifications might be made without departing from the scope of the invention, as defined in the appended claims.

Figure 6:
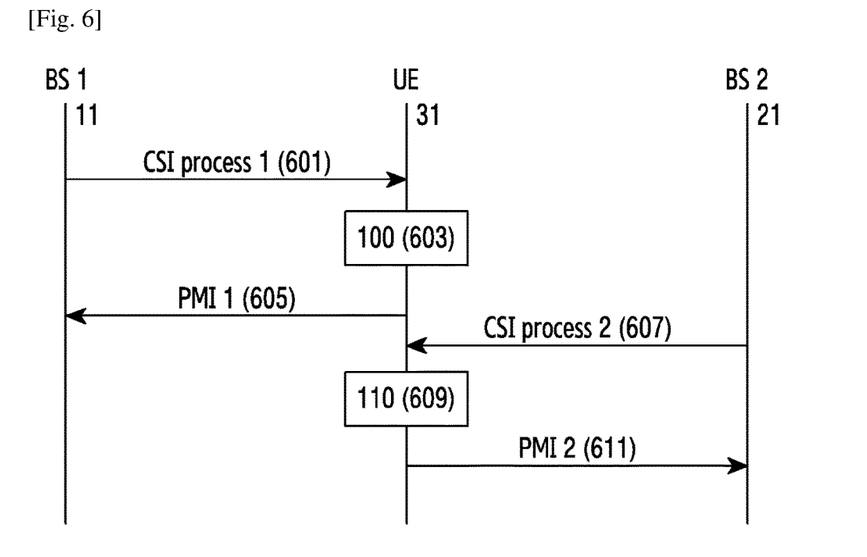
FIG. 6 illustrates a prior art CSI process and PMI feedback operation.

FIG. 6 shows the prior art technique associated with CSI and PMI Feedback. This figure shows the message exchanges between the UE 31 and two BSs 11, 21 with which it is operating in NCJT mode. In effect, the UE 31 interacts with each BS 11, 21 independently and performs a CSI process without taking into account the corresponding process performed in connection with the other of the two BSs.

The prior art specification supports NCJT such that UE 31 does not know if it is operating in NCJT mode or not. Therefore, UE 31 will have to treat the two CSI process independently, and computes PMIs independently for each CSI process.

In detail, UE 31 performs CSI process 601 in connection with BS1 11 and then computes at 603 PMI1 maximising throughput for CSI process 601. The PMI1 which is computed is then transmitted 605 to BS1 11. This is done in isolation from the process with respect to BS2 21, which follows in sequence. Of course, the sequence could be reversed. The UE 31 performs CSI process 607 in connection with BS2 21 and then computes at 609 PMI2 maximising throughput for CSI process 70. The PMI2 which is computed is then transmitted 611 to BS2 21.

In this way, the UE 31 conducts separate sequential operations with each BS and does not take steps to optimise the position, since it is not, by definition, considering the entire operational environment.

If more than two BSs are in use, then the method is adapted accordingly, as understood by the skilled person.

According to an embodiment of the present invention, there is provided a control signal from BS to the UE to indicate the operation of NCJT mode. Consequently, the UE is able to compute PMIs jointly. Further details are provided in FIG. 7.

Figure 7:
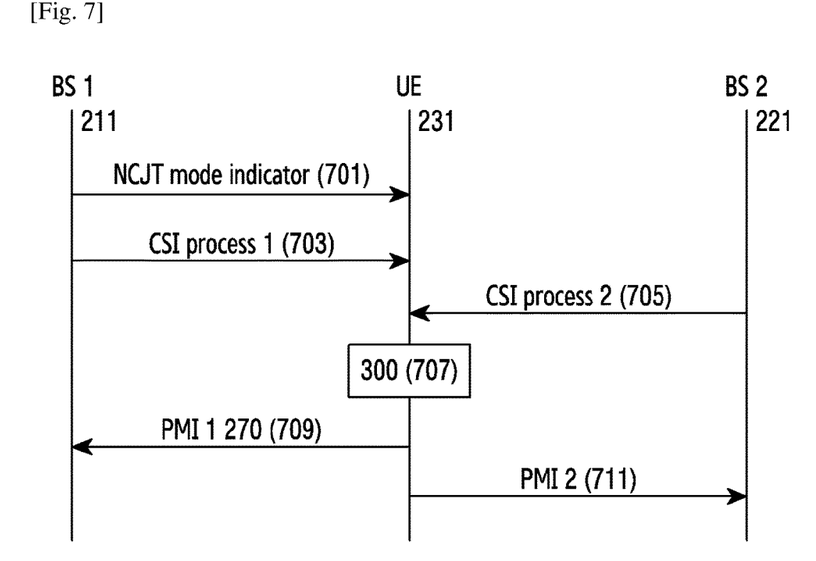
FIG. 7 illustrates a CSI process and PMI feedback operation according to an embodiment of the present invention.

FIG. 7 shows that the UE 231 is in communication with two BSs 211 and 221. It is operable in NCJT mode. A signal (NCJT mode indicator) is generated and transmitted 701 from one of the BSs—in this case BS1 211—and is used to indicate to the UE 231 that NCJT mode applies, which causes the UE 231 to adjust its computation of PMI1 and PMI2 compared to the prior art solution presented above. The NCJT mode indicator can be transmitted from the other BS 221.

Upon receipt of the NCJT mode indicator from BS1 211, the UE 231 performs CSI process 703 in connection with BS1 211. It then performs CSI process 705 in connection with BS2 221. At step 707, it computes PMI1 and PMI2 for CSI processes 703 and 705.

Subsequently, the UE 231 transmits PMI1 to BS1 211 at 709, and transmits PMI2 to BS2 221 at 711. These PMIs have been computed jointly and may differ from the PMI1 and PMI2 computed in FIG. 6. Of course, there are certain circumstances where PMI1 and PMI2 computed according to an embodiment of the invention will be identical with those computed in the prior art, but in most circumstances they will differ and offer better overall performance in terms of data throughput.

The NCJT mode indicator referred to which is a message passed to the UE 231 by one of the connected BSs may be transmitted in the form of a binary flag in an RRC message. This binary message indicates whether the UE is operating in NCJT mode or not.

An example of a suitable message structure is shown below:

```
NonTransparentNCJT ::=         CHOICE {
    enabled                    {TRUE, FALSE},
    NCJT_CSI_processes_IDs     BIT STRING (SIZE (8))
}
```

In the prior art situation shown in FIG. 6, whereby the CSI processes are treated independently, PMIs are selected independently for each CSI process, as follows:

$$W_k^* = \underset{w_k \in s_k}{\operatorname{argmax}} f(H_k, W_k), \forall k$$

where $f(H_k, W_k)$ is computed as:

$$f(H_k, W_k) = \log_2\left(1 + \frac{|H_k W_k|^2}{N_0 |\sum_{i \neq k} H_i|^2}\right)$$

In the equation above, $H_k$ is the channel between the $k^{th}$ BS and the UE, $W_k$ is the precoding matrix used at the $k^{th}$ BS, and $N_0$ is the noise component. The PMIs are optimised for each k, individually.

Embodiments of the present invention, by informing the UE 231 that NCJT mode is active allow UE 231 to jointly handle the CSI process and jointly compute the PMIs, as detailed in the following.

There follows details of a method for computing jointly computed PMIs i.e. PMI1 and PMI2, applicable to BS1 and BS2 respectively.

Let $\lambda_1, \lambda_2, \ldots, \lambda_N$ be the eigenvalues of $$(W_1^*, W_2^*, \ldots, W_N^*) = \underset{w_k \in s_k \forall k}{\operatorname{argmax}} f(H_1, H_2, \ldots, H_N, W_1, W_2, \ldots, W_N)$$

where $f(H_1, H_2, \ldots, H_N, W_1, W_2, \ldots, W_N)$ is computed as:

$$f(H_1, H_2, \ldots, H_N, W_1, W_2, \ldots, W_N) = \sum_{k=1}^{N} \log_2\left(1 + \frac{\lambda_k}{N_0}\right)$$

The PMIs are computed such that they maximise the joint function above, By means of embodiments of the present invention, a UE is able to better to coordinate its operation with respect to the two BSs with which it is communicating in NCJT mode.

According to various embodiments, a method of operating a telecommunications network comprising a plurality of base stations (BS), and a user equipment (UE). The plurality of BSs and the UE are operable in a particular transmission mode. and signals are transmitted between the BSs and the UE, and the transmission mode is indicated to the UE.

According to various embodiments, the transmission mode is Non-Coherent Joint Transmission, NCJT, mode.

According to various embodiments, the UE changes its mode of operation according to the indication.

According to various embodiments, the UE performs a channel status information (CSI) process in connection with each of the plurality of Base Stations, and the UE computes a Precoding Matrix Indicator, PMI, for each of the plurality of BS and transmits each PMI to each respective BS, and the computing of each PMI utilises information of the CSI process in relation to each of the plurality of base stations.

According to various embodiments, each PMI is computed such that the function:

$$f(H_1, H_2, \ldots, H_N, W_1, W_2, \ldots, W_N) = \sum_{k=1}^{N} \log_2\left(1 + \frac{\lambda_k}{N_0}\right)$$

is maximised.

According to various embodiments, the transmission mode is indicated to the UE by means of a signal from one of the plurality of BSs.

According to various embodiments, a UE operable in a telecommunication network, and operable to communicate in a coordinated manner with a plurality of BSs. The UE is sensitive to an indication that it is operable in a particular transmission mode and is further operable to change its mode of operation in response to the indication.

According to various embodiments, the transmission mode is Non-Coherent Joint Transmission, NCJT, mode.

According to various embodiments, a BS of a telecommunication network operable to indicate to a UE, with which it is in communication, an indication of a particular transmission mode.

According to various embodiments, the transmission mode is Non-Coherent Joint Transmission, NCJT, mode At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method performed by a user equipment (UE) in a wireless communication, the method comprising:
   receiving, from a base station (BS), configuration information for indicating whether a non-coherent joint transmission (NCJT) mode for coordinated multi-point operation (CoMP) is enabled or not;
   in case that the NCJT mode is enabled, obtaining CSI corresponding to a first signal based on a precoding matrix corresponding to a second signal, wherein the first signal and the second signal are associated with the CoMP;
   in case that the NCJT mode is not enabled, obtaining CSI corresponding to the first signal independently with the second signal; and
   transmitting the obtained CSI to the BS.

2. The method of claim 1, further comprising:
   performing a communication as the non-coherent joint transmission (NCJT) mode based on the configuration information.

3. The method of claim 1, wherein the configuration information is transmitted by using a radio resource control (RRC) signaling.

4. The method of claim 1, further comprising:
   utilizing a CSI process to derive the CSI based on the configuration information,
   wherein the CSI process is associated with CSI-reference signal (RS) resources for channel measurement.

5. The method of claim 1, wherein the CSI includes a precoding matrix indicator (PMI) for a precoding matrix corresponding to the first signal.

6. The method of claim 5,
   wherein the first signal is associated with the BS for the CoMP,
   wherein the second signal is associated with another BS for the CoMP, and
   wherein the PMI is computed such that a function:

$$f(H_1, H_2, \ldots, H_N, W_1, W_2, \ldots, W_N) = \sum_{k=1}^{N} \log_2\left(1 + \frac{\lambda_k}{N_0}\right)$$

is maximized, and
   where $H_i$ represents a channel matrix between the UE and i-th BS, Wi represents a precoding matrix for i-th BS, N represents a number of a plurality of BSs, $\lambda_k$, represents an eigenvalue for a channel for k-th BS, and No represents a noise.

7. A method performed by a base station (BS) in a wireless communication, the method comprising:
   transmitting, to a user equipment (UE), configuration information for indicating whether a non-coherent joint transmission (NCJT) mode for coordinated multi-point operation (CoMP) is enabled or not;
   receiving, from the UE, CSI corresponding to a first signal;
   wherein the CSI corresponding to the first signal is obtained based on a precoding matrix corresponding to a second signal in case that the NCJT mode is enabled; and
   receiving, from the UE, CSI corresponding to the first signal obtained independently with the second signal in case that the NCJT mode is not enabled,
   wherein the first signal and the second signal are associated with the CoMP.

8. The method of claim 7, further comprising performing a communication to the UE as the NCJT mode based on the configuration information.

9. The method of claim 7, wherein the configuration information is transmitted by using a radio resource control (RRC) signaling.

10. The method of claim 1, further comprising:
    in case that the NCJT mode is enabled, receiving a first demodulation reference signal, DMRS, based on an antenna port 7 from the BS, and a second DMRS based on an antenna port 8 from another BS associated with the second signal for the CoMP.

11. The method of claim 7, further comprising:
    in case that the NCJT mode is enabled, transmitting a first demodulation reference signal, DMRS, based on an antenna port 7 from the BS, and a second DMRS based on an antenna port 8 from another BS associated with the second signal for the CoMP.

12. A user equipment (UE) in a wireless communication system, the UE comprising:
   at least one transceiver; and
   at least one processor operably coupled to the at least one transceiver and configured to:
      control the at least one transceiver to receive, from a base station (BS), configuration information for indicating whether a non-coherent joint transmission (NCJT) mode for coordinated multi-point operation (CoMP) is enabled or not;
      obtain, in case that the NCJT mode is enabled, CSI corresponding to a first signal based on a precoding matrix corresponding to a second signal, wherein the first signal and the second signal are associated with the CoMP;
      obtain CSI, in case that the NCJT mode is not enabled, corresponding to the first signal independently with the second signal; and
      control the at least one transceiver to transmit the obtained CSI to the BS.

13. The method of claim 7,
   wherein the configuration information configures the UE to utilize a CSI process to derive the CSI, and
   wherein the CSI process is associated with CSI-reference signal (CSI-RS) resources for channel measurement.

14. The method of claim 13, wherein the CSI includes a precoding matrix indicator (PMI) for a precoding matrix corresponding to the first signal.

15. The method of claim 14,
   wherein the first signal is associated with the BS for the CoMP,
   wherein the second signal is associated with another BS for the CoMP, and
   wherein the PMI is computed such that a function:

$$f(H_1, H_2, \ldots, H_N, W_1, W_2, \ldots, W_N) = \sum_{k=1}^{N} \log_2\left(1 + \frac{\lambda_k}{N_0}\right)$$

is maximized, and
   where $H_i$ represents a channel matrix between the UE and i-th BS, $W_i$ represents a precoding matrix for i-th BS, N represents a number of a plurality of BSs, $\lambda_k$, represents a eigenvalue for a channel for k-th BS, and $N_0$ represents a noise.

16. The UE of claim 12, further comprising:
   in case that the NCJT mode is enabled, receiving a first demodulation reference signal, DMRS, based on an antenna port 7 from the BS, and a second DMRS based on an antenna port 8 from another BS associated with the second signal for the CoMP.

17. The UE of claim 12, wherein the at least one processor is further configured to perform a communication as a non-coherent joint transmission (NCJT) mode based on the configuration information.

18. The UE of claim 12,
   wherein the configuration information is transmitted by using a radio resource control (RRC) signaling.

19. The UE of claim 16, wherein the at least one processor is further configured to utilize a CSI process to derive the CSI based on the configuration information, and
   wherein the CSI process is associated with CSI-reference signal (RS) resources for channel measurement.

20. The UE of claim 16, wherein the CSI includes a precoding matrix indicator (PMI) for a precoding matrix corresponding to the first signal.

* * * * *